United States Patent
Kumagai et al.

(10) Patent No.: US 7,598,869 B2
(45) Date of Patent: *Oct. 6, 2009

(54) METHOD TO PERSONALIZE AND ENHANCE THE VALUE OF CONSUMER ITEMS FOR USE IN OUTDOOR ACTIVITIES

(76) Inventors: Monto H. Kumagai, 717 Oak Ave., Davis, CA (US) 95616; Philip Miller, 1058 Hermes Ave., Leucadia, CA (US) 92024

( * ) Notice: Subject to any disclaimer, the term of this patent is extended or adjusted under 35 U.S.C. 154(b) by 123 days.

This patent is subject to a terminal disclaimer.

(21) Appl. No.: 11/560,863

(22) Filed: Nov. 17, 2006

(65) Prior Publication Data

US 2007/0188331 A1   Aug. 16, 2007

Related U.S. Application Data

(60) Provisional application No. 60/738,105, filed on Nov. 17, 2005.

(51) Int. Cl.
*G08B 13/14* (2006.01)
(52) U.S. Cl. ............ 340/572.1; 340/10.51; 340/539.13; 340/572.8; 455/90.1; 455/414.1; 455/456.3
(58) Field of Classification Search ............ 340/572.1, 340/572.4, 572.8, 10.51, 10.6, 531, 539.1, 340/539.11, 539.13; 455/456.1, 456.3, 457, 455/412.1, 414.1, 90.1, 556.1; 342/357.06; 379/88.13; 709/231
See application file for complete search history.

(56) References Cited

U.S. PATENT DOCUMENTS

| 2004/0074966 | A1* | 4/2004 | Holzer | 235/385 |
|---|---|---|---|---|
| 2004/0088231 | A1* | 5/2004 | Davis, Jr. | 705/28 |
| 2004/0140349 | A1* | 7/2004 | Shaw | 235/375 |
| 2004/0201738 | A1* | 10/2004 | Moores et al. | 348/231.2 |
| 2005/0264421 | A1* | 12/2005 | Yun | 340/572.1 |
| 2007/0042844 | A1* | 2/2007 | Stote et al. | 473/564 |

* cited by examiner

*Primary Examiner*—Thomas J Mullen (57) ABSTRACT

The present invention provides a method to personalize and enhance the value of consumer items for use in outdoor activities. It utilizes radio frequency identification (RFID) tags, computers, PDAs, and cell phones to link, record, and retrieve positional, personal, and historical data. The personalization and association of an object to a unique event by the consumer will lead to enhanced value of the product. Information that is stored on cell phones, PDAs, computers, and external databases are transferred as multimedia messages. The information is cataloged and organized using the unique RFID number. The subject line of the multimedia message is the RFID tag number. Commercial items such as skis, coats, hats, shoes, shirts, pants, gloves, sun glasses, surfboards, bicycles, wetsuits, cell phones, computers, golf clubs, golf balls, fishing poles, and lures will be produced that contain RFID tags.

3 Claims, 2 Drawing Sheets

METHOD TO PERSONALIZE AND ENHANCE THE VALUE OF CONSUMER ITEMS FOR USE IN OUTDOOR ACTIVITIES

This application claims benefit of U.S. Provisional Application No. 60/738,105, filed Nov. 17, 2005.

FIELD OF INVENTION

This invention relates to a method to connect images, memories, names, and positional data to recreational items. It describes a system for tracking and managing personal and historical information.

BACKGROUND OF THE INVENTION

Sample tracking and data storage system

We have developed electronic tracking systems and databases to store diverse information. Barcodes are currently in wide use for tracking. Although barcodes are convenient to use indoors, they have limitations for use in the outdoor environment. To record data on a barcode requires a thermal printer and computer. We have developed a novel "electronic barcode" system that uses radio frequency identification (RFID) tags and use the tags as an alternate media to "traditional" barcodes to enhance the value of consumer recreational items.

RFIDs are devices that are queried by radio frequency transmission and may be operated without external power. The miniaturized tag is about the size of a postage stamp and can store up to 32 kilobytes of data. This feature is highly desirable for use in outdoor settings.

The RFID or radio frequency identification tags are electronic alternatives to barcodes. RFID tags are coming into wide use in the electronics industry. New applications are being rapidly developed as costs continue to drop and capacities increase. The proposed system uses a modified handheld computers (PDAs) and cell phones to read, write, and store information to and from the RFID tags. Since many of the RFLD applications are performed outdoors, a major challenge is to keep track of the item identification number and the precise location where the event was experienced. In our application, we describe a method to record consumer relevant information using cameras that are attached to the handheld computers or cell phones. The stored images, date, time, comments, voice recordings, and global positional settings (GPS) have been linked to RFID tags and relational databases.

The method we describe to increase the intrinsic value of consumer items consists of the following five steps or processes: enhance, experience, personalize, recall, and share. Although there is similar art that covers some portions of the procedure, this invention describes the integration of the parts that results in a robust, rich, mobile method to enhance and personalize consumer items for use in the outdoor environment. The enhancement step begins with the association of a consumer item to a RFID tag. The electronic, RFID devices have been described and we have shown that they are able to withstand extreme changes in temperature, pressure, and liquid environments. RFID tags can be embedded during the manufacturing process or they can be directly added to the finished product. In one example we have placed a RFID tag on a fishing lure. After the RFID tag is attached to the consumer product, the user in the outdoor environment experiences an event. For example, a large saltwater fish (yellowfin tuna) was caught using a RFID enabled lure. Information or links about the event were recorded and transferred to the modified lure. The data in the examples were GPS readings, measurements (size and weight), photos, audio, or video files. Transferring the information to the consumer item resulted a personalized product. There are examples of this process in the electronic industry where an individual adds preferred artwork, photos, and audio files to cell phones, portable music players, and laptop computers. The personalized RFID product is queried after the experience. For example, a fisherman returns from a trip to the tropics and reads his RFID enabled lure using a modified cell phone. Information about the event is replayed on the screen of the cell phone. RFID technology is used to quickly retrieve information that was previously recorded. Recalling the event is a rewarding experience and results in increasing the inherent value of the consumer item. Since the information is presented on a mobile cell phone or laptop computer it can be quickly shared with others using email or multi media messaging (MMS). We have developed an inexpensive mobile, method that uses the RFID serial numbers as unique identifiers to send, store, and retrieve information.

DESCRIPTION OF THE RELATED ART

In the past, inventory control has become a major challenge. As the number of samples increase and the conditions in which they are stored change, there has been a need to develop new methods. There have been procedures to track samples using RFID. U.S. Pat. No. 5,743,815 showed a method to remotely track dispersed objects (golf balls) containing implanted RFID tags in the environment. A RFID system to locate lost golf balls was described in U.S. Pat. No. 5,626,531. Methods for tracking mobile organisms using implanted RFID tags and integrated databases were described in U.S. Pat. No. 5,235,326. In U.S. Pat. No. 5,631,835, RFID technology was developed to track materials (garbage) in a mobile environment and to maintain processing records. In U.S. Pat. No. 5,139,744, methods were developed to monitor microtiter plates in automated laboratories. U.S. Pat. No. 5,832,488 showed the use of smart cards to store and process information concerned with the history of the laboratory procedures. Computer systems have been developed to track large numbers of RFID tags in various indoor and outdoor environments. U.S. Pat. No. 7,102,509 showed how RFID tags can be used to monitor inmate populations in prisons, alternate environments, and homes.

There is prior art that showed methods to track and store data associated with agricultural products, recreational equipment, or outdoor events. U.S. Pat. No. 6,796,504 utilized a RFID system to track GMO products and U.S. Pat. No. 6,859,672 described a method to link food products with their food source. Non-visual identification of fishing gear using RFID tags was described in U.S. Pat. No. 7,025,254. U.S. Pat. No. 6,836,215 on RFID enabled wristbands and U.S. Pat. No. 6,614,392 on GPS and intelligent labels can be used in recreational activities. Photos of outdoor events are stored and retrieved using RFID technology described in U.S. Pat. No. 6,785,739. A method that utilized RFID tags in a hunting tournament was described in U.S. Pat. No. 6,317,030.

RFID technology can be used to write information onto children's toys. U.S. Pat. No. 7,066,781 showed that RFID tags could be used to enhance the personality of a toy and could be used in interactive games. Internal placement of the tags within a toy allowed for non-evasive, wireless communication of stored data.

Handheld devices such as modified cell phones, PDAs, and portable computers have been developed which are capable of reading, writing, and transmitting RFID data. U.S. Pat. No. 7,117,374 described how to scan objects with handheld devices to trigger access to internet web sites and other databases. U.S. Pat. No. 7,123,696 showed that visiting a specific web page can trigger the retrieval of personalized media clips. Methods that enhance telecommunication services by combining cell and RFID technology was described in U.S. Pat. No. 7,127,261.

SUMMARY OF THE INVENTION

The present invention describes a method to personalize and enhance the value of an object by recording electronic information using radio frequency identification (RFID) tags. The method is comprised of the following steps: labeling with RFID tags, experiencing an event, recording personalized, graphical and historical information, retrieving the data at a later time, and sharing it with others using email or multimedia messaging.

In one embodiment an enhanced recreational item is presented, the recreational item being attached to a RFID tag. The RFID tag contains personalized event related information deposited on the RFID tag and/or a link to information.

In this embodiment, the recreational item can be but is not limited to a toy wherein the toy is a stuffed animal a sports item wherein the sports item is skiing, diving, or surfing equipment or hunting equipment, a surfboard, a snowboard, a trophy, ski, fishing pole, fishing lure, gun, bicycle, a wetsuit, a golf ball, or golf club; an item of clothing wherein the item of clothing is a hat, a scarf, a coat, a shirt, a sweater, a sweat shirt, a shoe, a glove, or pants; a vehicle wherein the vehicle is a scooter, a car, a motorcycle, an airplane, a train, or a skateboard; and a gift item, a ticket, a post card, and sun glasses.

In another embodiment we present a method of enhancing a recreational item by attaching an RFID tag to the recreational item, Recording personalized event information, Depositing the event information on the RFID tag during the event. In this embodiment, the recreational item can be but is not limited to a toy wherein the toy is a stuffed animal a sports item wherein the sports item is skiing, diving, or surfing equipment or hunting equipment, a surfboard, a snowboard, a trophy, ski, fishing pole, fishing lure, gun, bicycle, a wetsuit, a golf ball, or golf club; an item of clothing wherein the item of clothing is a hat, a scarf, a coat, a shirt, a sweater, a sweat shirt, a shoe, a glove, or pants; a vehicle wherein the vehicle is a scooter, a car, a motorcycle, an airplane, a train, or a skateboard; and a gift item, a ticket, a post card, and sun glasses. One or more information links could be included on the RFID tag. Different information elements can be deposited on the RFID tag before, during or after the recreational event to which the enhanced item is relevant.

In another embodiment a fishing lure can be enhanced by the steps of attaching an RFID tag to the fishing lure, catching a fish is with the RFID-tagged lure, recording information such as GPS data, fish size, fish weight, photos, audio files, and video files and/or a link to information and transferring the information to the RFID-tagged lure to be recalled later. The information can then be recalled and shared.

In another embodiment a method of recording and recalling a consumer experience is presented. The method involves the steps of associating an RFID tag to a recreational item to allow the RFID-tagged item to be associated with an event. Experiencing the event with the RFID-tagged recreational item, recording information comprising personal and historical information associated with said event, and depositing the information on the RFID tag that is associated with the recreational item so that the experience can be recalled from the RFID tag that is associated with the recreational item, recalling said information and sharing the information. The recreational item can be but is not limited to a toy wherein the toy is a stuffed animal a sports item wherein the sports item is skiing, diving, or surfing equipment or hunting equipment, a surfboard, a snowboard, a trophy, ski, fishing pole, fishing lure, gun, bicycle, a wetsuit, a golf ball, or golf club; an item of clothing wherein the item of clothing is a hat, a scarf, a coat, a shirt, a sweater, a sweat shirt, a shoe, a glove, or pants; a vehicle wherein the vehicle is a scooter, a car, a motorcycle, an airplane, a train, or a skateboard; and a gift item, a ticket, a post card, and sun glasses.

In another embodiment, a method is presented for personalizing a consumer item for use in outdoor activities, the method comprising: (a) linking; (b) recording; and (c) retrieving positional, personal, and historical data in a commercial item. The recreational item can be but is not limited to a toy wherein the toy is a stuffed animal a sports item wherein the sports item is skiing, diving, or surfing equipment or hunting equipment, a surfboard, a snowboard, a trophy, ski, fishing pole, fishing lure, gun, bicycle, a wetsuit, a golf ball, or golf club; an item of clothing wherein the item of clothing is a hat, a scarf, a coat, a shirt, a sweater, a sweat shirt, a shoe, a glove, or pants; a vehicle wherein the vehicle is a scooter, a car, a motorcycle, an airplane, a train, or a skateboard; and a gift item, a ticket, a post card, and sun glasses.

In another embodiment, a method is presented for retrieving and sharing personalized event-related information wherein the subject line of a message or name of a data set is an RFID identifier.

In another embodiment, a tracking and recording system is presented. The tracking and recording system includes a recording device, a recreational item, an RFID tag attached to the recreational item, the RFID tag containing personalized event-related information that has been captured by the recording device and electronically deposited on the tag, an information retrieval device, and a database. The recording and retrieval device can be but is not limited to a RFID enabled cell phone, a RFID enabled PDA or a RFID enabled computer, a RFID enabled music, photo, or video player. The recreational item can be but is not limited to a toy wherein the toy is a stuffed animal a sports item wherein the sports item is skiing, diving, or surfing equipment or hunting equipment, a surfboard, a snowboard, a trophy, ski, fishing pole, fishing lure, gun, bicycle, a wetsuit, a golf ball, or golf club; an item of clothing wherein the item of clothing is a hat, a scarf, a coat, a shirt, a sweater, a sweat shirt, a shoe, a glove, or pants; a vehicle wherein the vehicle is a scooter, a car, a motorcycle, an airplane, a train, or a skateboard; and a gift item, a ticket, a post card, and sun glasses.

In another embodiment, a method is presented for using an RFID tag. The RFID tag is attached to an item that is associated with said recreational event. The method comprises recording on the RFID tag personalized event information such as location, time, and events that are associated with a recreational event. The recreational event can be a one-time event, a periodic event, or an occasional event or a reoccurring event. The recreational item can be but is not limited to a toy wherein the toy is a stuffed animal a sports item wherein the sports item is skiing, diving, or surfing equipment or hunting equipment, a surfboard, a snowboard, a trophy, ski, fishing pole, fishing lure, gun, bicycle, a wetsuit, a golf ball, or golf club; an item of clothing wherein the item of clothing is a hat, a scarf, a coat, a shirt, a sweater, a sweat shirt, a shoe, a glove, or pants; a vehicle wherein the vehicle is a scooter, a car, a motorcycle, an airplane, a train, or a skateboard; and a gift item, a ticket, a post card, and sun glasses.

BRIEF DESCRIPTION OF THE FIGURES

Those skilled in the art will understand that these embodiments are representative only of many consumer items containing RFID tags. All such materials are contemplated and intended to be within the scope of the present invention.

DESCRIPTION OF THE SPECIFIC EMBODIMENTS

Definitions

In order to provide a clear and consistent understanding of the specification and the claims, including the scope given herein to such terms, the following definitions are given:

The term "attached" refers to the placement of the RFID tag on the consumer item. They are in close association with each other. The RFID tag can be placed on, below, or within the recreational item.

The term "personalized event related information" refers to data that is personal and/or historical in nature. It includes but is not limited to names, ages, measurements, records, benchmarks, events, time, dates, seasons, climates, temperatures, pressures, locations, GPS positions, altitudes, unique identifiers, RFID numbers, database links, recreational items, and sport activities.

The term "RFID identifier" or "RFID number" refers to a unique symbol consisting of numbers and/or letters. We provide examples of sixteen-decimal RFID identifiers. Often the RFID numbers are assigned to the individual tags during the manufacturing process.

Since the numbers are rare or unique they can be used as names of objects in large, diverse databases. The identifier can also be a combination of a unique symbol and time and/or location.

The term "recreational item" refers to an object that is involved in providing a relaxing, enjoyable, and entertaining activity for the consumer. A recreational item includes but is not limited to a toy wherein the toy is a stuffed animal, a sports item wherein the sports item is skiing, diving, or surfing equipment or hunting equipment, a surfboard, a snowboard, a ski, a fishing pole, fishing lure, a fish, a gun, a bicycle, a trophy, a wetsuit, a golf ball, or a golf club, an item of clothing wherein the item of clothing is a hat, a scarf, a coat, a shirt, a sweater, a sweat shirt, a shoe, a glove, or pants, a vehicle wherein the vehicle is a scooter, a car, a motorcycle, an airplane, a train, or a skateboard, a gift item, a ticket, a post card, and sun glasses.

The term "consumer item" refers to a commercial product that has been acquired by an individual for direct use or personal ownership.

The term "enhanced intrinsic value" refers to an increase in the worth of an item based on its usefulness or importance to the consumer The Invention The components of the system are: 1) a consumer item or recreational equipment with an embedded transponder (RFID) called a RFID signpost (RSP); 2) readers for data collection (cell phone, PDA); and 3) a computer database. The transponder (RFID) uniquely identifies the RSP with a digital identification "number". As the RSP is moved around in the environment, information is added to the RFID device containing memory and a microprocessor chip. The device is an industry standard RFID tag, compliant with ISO 14443-2 type A. The architecture of the RFID signpost and its integration in the outdoor environment are described below.

Figure 1:
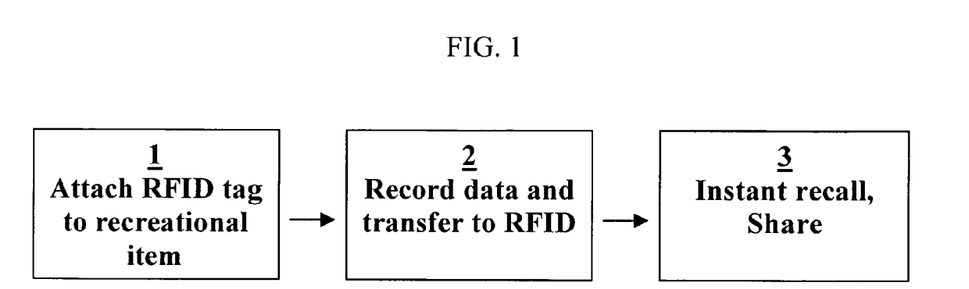
FIG. 1 is a flow diagram showing a three step process for making and using the enhanced recreational item to recall and share an expenence.

Referring to FIG. 1, "RFID Data flow", an RFID tag is attached to a recreational item 1; the data is recorded and transferred to the RFID tag 2; and the data is then recalled and shared 3.

Figure 2:
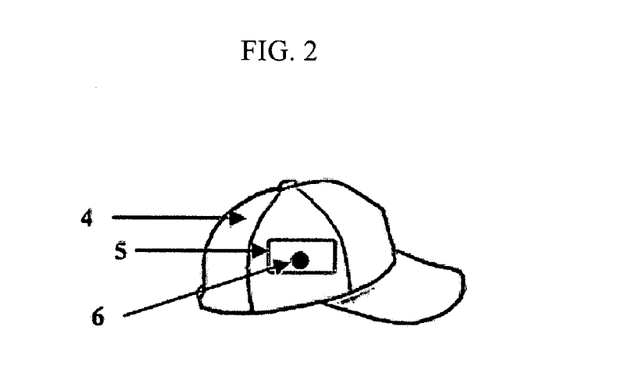
FIG. 2 shows a RFID signpost recreational item that includes a hat (1), patch (2), and RFID transponder (3).

Referring to FIG. 2, the components of the RSP are shown. These are a consumer item 4, a patch 5, and a miniature RFID transponder 6 that holds a unique serial number. The tag also contains memory chips with an embedded software program. These components are passive and do not contain batteries. They receive and transmit data only when interrogated by the appropriate readers. All parts within the system are qualified to withstand extreme outdoor environments.

Figure 3:
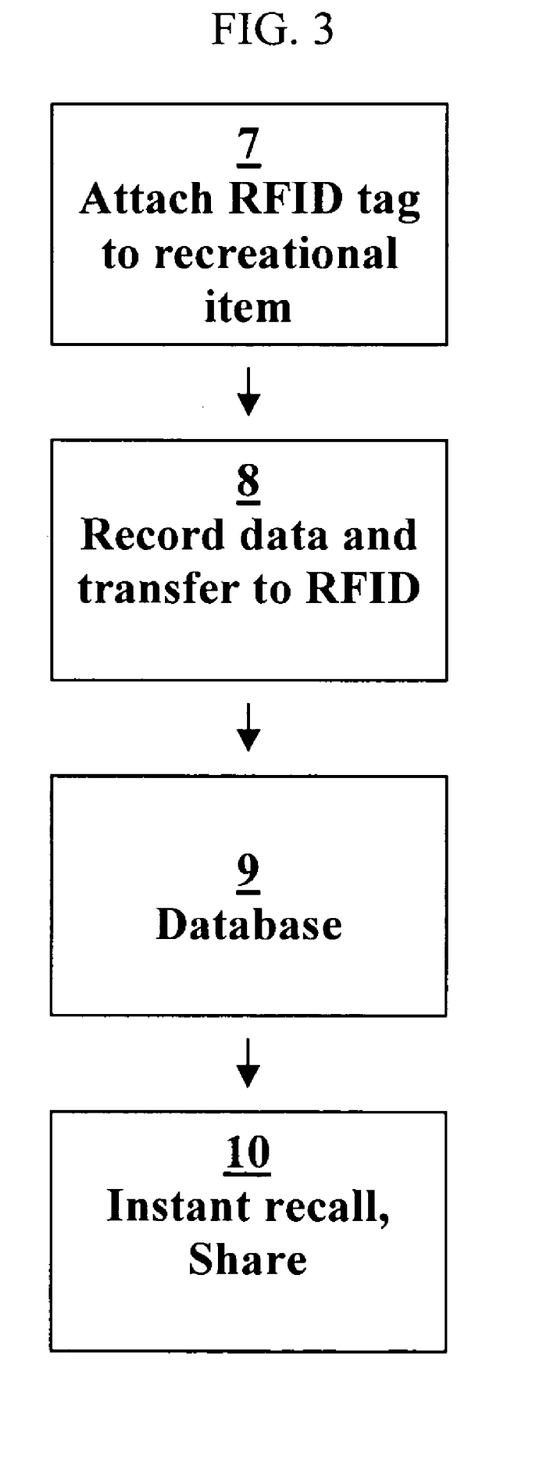
FIG. 3 is an RFID data flow diagram.

Referring to FIG. 3, Event Flow Chart, the first step is to initialize the RFID signpost. When first received, the RSP has an RFID tag with a factory programmed number. A large number of bits are used (typically at least 39) to allow a unique set of serial numbers. The RFID tag contains the programmed information, but is otherwise blank. Initializing takes place using a modified cell phone or PDA that has both a RFID reader and writer. The RFID number is read from and written into a specific field of the tag memory. Data stored on the chip may also be encrypted to provide for security requirements. DES and other commercial encryption methods may be applied to ensure the security of the information. Once initialized the RSP is ready for outdoor use. In the flow diagram an RFID tag is attached to a recreational item 7; personalized event-related data is recorded and transferred to the RFID tag 8; the recorded data is transferred to a database 9 and; the data is recalled and shared 10.

The initialization processing steps and sequences are defined for the RSP. This may be for an individual item or for a collection of items depending on the equipment used. In an automated environment an in line "entry" reader can access this stored data and transmit it to the processing controller. After processing is complete the RSP is passed over an "exit" reader and results or completion status (location, equipment, time, date, status) can be written.

"The Outdoor Network", the data collection system components are thus: RFID tagged equipment, handheld readers, a LAN or wireless network, and file servers. The outdoor entertainment equipment (recreational item) can be but is not limited to a toy wherein the toy is a stuffed animal, a sports item wherein the sports item is skiing, diving, or surfing equipment or hunting equipment, a surfboard, a snowboard, a ski, a fishing pole, fishing lure, a fish, a gun, a bicycle, a trophy, a wetsuit, a golf ball, or a golf club, an item of clothing wherein the item of clothing is a hat, a scarf, a coat, a shirt, a sweater, a sweat shirt, a shoe, a glove, or pants, a vehicle wherein the vehicle is a scooter, a car, a motorcycle, an airplane, a train, or a skateboard, a gift item, a ticket, a post card, and sun glasses.

The RFID timeline consists of experiencing an event, recording data, transferring information, recalling and sharing the personal and historical information.

EXAMPLES

Example 1

Using RFID Technology to Record a Visit to the Beach

RFID technology can be used to record events. This process has been demonstrated in the tropical outdoors. RFIDs have been used in Hawaii at Kailua beach on the island of Oahu.

In order to retrieve information, the Treo 650 cell phone (Cingular) was placed in close proximity to the RFID tag. Unlike traditional barcodes, the transponder (RFID tag) does not need to be in direct line of sight. It can be embedded in clothing, plastic, recreational equipment that can be covered with material or debris. This feature is important in outdoor settings where dirt, salt, snow, rain and dust is prevalent. For our beach experiment, a label containing the transponder was placed directly behind a patch that was embroidered into a towel. The GPS location of the beach was directly written on the RFID tag. To initiate the process, a touch screen button was pressed to activate cell phone. The RFID receiver switched to the detection mode and read the tag. An attention signal displayed on the reader indicated that RFID device had been found and that the data had been transferred. The unique sixteen-decimal RFID identifier was displayed on the screen along with the local position (ex. E0070000021BF33C Kailua). A photo of a dog on the beach was taken using the camera on the cell phone. Audio information about the event e.g. early morning sunrise at the beach) was recorded and directly linked to the picture. The name of the photo was changed to ZEN1 and entered into the cell phone contact database. This program is normally used to store addresses and telephone numbers. In order to locate the exact file a query was performed on the cell phone searching for the photo ZEN1. The information can also be found by searching the database for the unique RFID number.

The precise location of Kailua beach was recorded using a GPS enabled PDA. The GPS reading was photographed using the cell phone. The name of the photo was changed to ZEN2 and sent by multimedia messaging to a personal email account. This information was later used to update a remote database. In addition, the actual GPS reading was written on the RFID tag. To initiate this process, a touch screen button on the cell phone was pressed to activate the Ande 929 RFID program (Tradewinds). The GPS reading and additional data was entered using the digital key pad on the cell phone. A touch screen button was then pressed and the receiver switched to the writing mode and recorded the information on the RFID tag. The newly entered data was verified using the cell phone RFID reader.

Data links that were written on the RFID tags have been used to instantaneously retrieve text, photos and audio files. The information was archived on local and distal databases. The photos were viewed on the PDA or cell phone display and the audio files were replayed using the embedded speaker. Personalized information such as name, date, location, and GPS that were directly written on the RFID tag were simultaneously viewed on the receiver's screen while seeing the photographs and listening to the audio files. This process provided a rich, integrated way to view memorable events. Our mobile method has allowed the user to recall a special event and directly link it to a recreational object (beach towel).

Example 2

Recording Catch Data on a Fishing Pole

A rectangular 1¼ "by 2" RFID tag was attached to a deep sea fishing pole and tested in Taveuni, Fiji. On Aug. 6, 2005, barracuda, tuna, and walu were caught trolling artificial lures. A photo of the fish was taken using a Treo 650 cell phone. The name of the photo was changed to the unique RFID identifier (E0070000021BF377) and sent via multimedia messaging (MMS) to an email account. Information about the fishing trip (type of fish, size, date and location) was written on the RFID tag. Data links that connect the photos, text, and audio files were also written on the RFID tag. The subject line of the multimedia message contained the unique RFID number. Upon returning to the United States, memories of the Fijian fishing trip were shared with friends using RFID technology. In this process, a RFID enabled cell phone was placed adjacent to the tag. A touch screen button was pressed instructing the phone to read the tag. The unique sixteen-decimal RFID identifier was displayed on the screen along with the catch data, date, and fishing location. The unique RFID identifier was used to search the cell phone multimedia database. Since the subject line of the MMS contained the RFID identifier, the cell phone search engine quickly located the information. The specific multimedia message containing fishing photos, text, and audio files was retrieved and displayed on the cell phone. This process provided a rapid method to recall the fishing trip and directly linked it to a recreational object that contained the RFID tag (fishing pole). In addition, the multimedia message about the Fijian fishing trip was sent to relatives and friends by email. This process could lead to an enhanced interest in Fiji, fishing, vacations, and tropical resorts. By attaching or embedding the RFID tags to consumer items, it will increase the value of those items that were purchased during the trip. Using RFID technology we have developed a method to personalize inanimate objects.

Example 3

Recording Catch Data on a Fishing Hat

A rectangular 1¼ "by 2" RFID tag was used to record fishing data in Kenai, Alaska. On Jun. 29, 2005, three King salmon were caught from a boat on the Kenai river. A photo of the fish was taken with the Treo 650 cell phone. The name of the photo was changed to the unique RFID number (E007000002003078) and sent via multimedia messaging (MMS) to an email account. The fish were measured and recorded on the RFID tag. A 43 inch salmon was brought on board the boat and the other two (48 inch and 49 inch) salmon were released alive. Additional information about the fishing trip (type of fish, estimate weight, date, and location) was written on the RFID tag. The data link that connected the photos, text, and audio files was the RFID tag number. The subject line of the multimedia message contained the unique RFID number. Upon returning to Hawaii, the RFID tag was embedded inside of a fishing hat (FIG. 2) that was purchased in Alaska. Memories of the Alaskan fishing trip were shared with friends using RFID technology. In this process, a RFID enabled cell phone was placed adjacent to the fishing hat containing the tag (FIG. 3). A touch screen button was pressed instructing the phone to read the tag. The unique sixteen-decimal RFID identifier was displayed on the screen along with the catch data, date, and fishing location. The unique RFID identifier was used to search the cell phone multimedia database. Since the subject line of the MMS contained the RFID identifier, the cell phone search engine quickly located the information. The specific multimedia message containing fishing photos, text, and audio files was retrieved and displayed on the cell phone. This process provided a rapid method to recall the fishing trip and directly linked it to a fishing hat that contained the RFID tag. In addition, the experience was shared with others by emailing the multimedia message to relatives and friends.

Example 4

Recording a Birthday Celebration on a Postcard

A rectangular 1¼ "by 2" RFID tag was used to record a birthday party in Honolulu, Hi. On Apr. 10, 2005, a birthday was celebrated at the Honolulu Aquarium. A photo of a saltwater fish tank was taken with the Treo 650 cell phone. The name of the photo was changed to the unique RFID number (E0070000125003B5) and sent via multimedia messaging (MMS) to an email account. Additional information about the birthday (date, name, and location) was written on the RFID tag. The data link that connected the photos, text, and audio files was the RFID tag number. The subject line of the multimedia message contained the unique RFID number. Upon returning home, the RFID tag was place in back of a postcard that purchased from the Honolulu Aquarium. Memories of the birthday party were shared with friends using RFID technology. In this process, a RFID enabled cell phone was placed adjacent to the postcard containing the tag. A touch screen button was pressed instructing the phone to read the tag. The unique sixteen-decimal RFID identifier was displayed on the screen along with the birthday girl's name, date, and location. The unique RFID identifier was used to search the cell phone multimedia database. Since the subject line of the MMS contained the RFID identifier, the cell phone search engine quickly located the information. The specific multimedia message containing aquarium photo, text, and audio files was retrieved and displayed on the cell phone. This process provided a rapid method to recall the birthday party and directly linked it to a postcard that contained the RFID tag (FIG. 5). In addition, the experience was shared with others by emailing the multimedia message to relatives and friends.

Example 5

RFID Enabled Business Card

A circular RFID tag (HID Inc., Irvine, Calif.) was attached to a business card. The URL for the Kenai River Retreat (www.kenairiverretreat.com) was written on the tag using a RFID AirID Writer (RF Ideas, Arlington Heights, Ill.). An additional rectangular 1¼ "by 2" RFID tag that was attached to the same business card was used to record events. On Jun. 26, 2005 a photo of two calves and large female moose was taken from the back porch of the condo at the Kenai River Retreat using a digital camera. The name of the photo was changed to the unique RFID number (E0070000021BF332) and sent via multimedia messaging (MMS) to an email account. Additional information about the wildlife (name of animals, location, and date) was written on the RFID tag. The subject line of the multimedia message contained the unique RFID number. Memories of the moose sighting and the Kenai River Retreat were shared with friends using RFID technology. In this process, a RFID enabled cell phone was placed adjacent to the business card containing the tag. A touch screen button was pressed instructing the phone to read the tag. The unique sixteen-decimal RFID identifier was displayed on the screen along with the moose sighting, name of the resort, date, and location. Additional information about the accommodations was obtained using a Macintosh PowerBook G4 laptop computer. In this process, the URL box in the Netscape search engine was highlighted. The business card was placed on an Air ID playback USB reader (RF Ideas, Arlington Heights, Ill.) that was connected to the computer. The URL and an additional keystroke (enter) that was written on an RFID tag was automatically entered into Netscape and the homepage of Kenai River Retreat was displayed on the computer screen. This process provided a rapid method to recall the experience of seeing a family of moose in Alaska. It linked the business card and home page of the resort to a personal event.

Example 6

Temperature Testing of RFID Tags and Labels

One of the major advantages of RFID tags is that they are extremely durable. Since the passive transponders (RFID tags) do not require batteries they can withstand extreme temperatures. This feature is important in outdoor settings where the devices are used at different elevations and are exposed to various temperature regimes. In our environmental tests, information was written on the tags using handheld devices. They were then subjected to various temperature conditions for at least 30 minutes. In order to retrieve the data, the devices were returned to room temperature and read. We tested the ability of Picotags (Inside Contactless, France) and Ti-tags (Texas Instruments, Dallas, Tx.) to store information at −80° C., −20° C., 25° C., and 100° C. The RFID tags were also submersed in liquid nitrogen for 15 minutes and autoclaved for 20 minutes. Both of the tags were able to work in all of the conditions that were tested.

Example 7

Testing of RFID Tags and Labels in Aqueous Liquids and Organic Solvents

In our experiments compounds from plants are extracted into aqueous buffers or organic solvents. In order to reduce the chance of mislabeling RFID tags are placed in the voucher bags or tubes along with the plant samples. This procedure requires the transponders (RFID tags) to be exposed to various liquid solutions. We have submerged the RFID tags in organic solvents such as alcohol, phenol, acetonitrile, and chloroform. They have also been tested in aqueous buffers and salt water. Information on the tags was obtained by reading the devices semi-wet (in solution) or after they were removed from the liquid. The RFID tags were fully functional in all of the solvents and aqueous solutions tested. The transponders could withstand a variety of chemical conditions including plant extracts in organic solvents that were stored at −80° C. Information could be updated on the tag without removing the tag from the falcon tube containing the plant extract. This feature is useful because we have been able to enter results from assays on the tags without thawing out the sample.

Example 8

Testing of RFID Tags and Labels in Outdoor Tropical Sunlight.

The RFID tags might be embedded or attached to outdoor recreational, consumer items such as skis, bicycles, climbing equipment, fishing poles, sun glasses, gloves, shoes, and hats. One of the major challenges of spending time in the tropical or outdoor environment is material damage caused by exposure to the intense sunlight. In order to address this issue, a rectangular 30 mm×30 mm Picotag (Inside Contactless, France) was attached to mango tree using monofilament line. Information that included the date, location, and type of tree (mango) was written directly on the tag using a Handspring PDA (Palm, Sunnyvale, Calif.) that was equipped with an Inside Contactless RFID reader. A yellow wristband containing a transponder was also attached to the tree. The same data was written on the RFID tag using a Tradewind Treo 650 reader. Six months later information from both of the RFID tags was retrieved. The tags were stable when exposed to tropical sunlight for at least six months.

Example 9

Replaying Catch Data on a RFID Enabled Fishing Pole Using Multimedia Messaging

A photo of a fish, GPS, and time stamp was recorded using a RFID cell phone or RFID PDA. The information was relayed to an electronic web page and the unique address was recorded on a RFID tag that was operationally attached to a fishing pole. Information about the event was retrieved using the RFID cell phone or RFID PDA and was sent as a multimedia message.

Example 10

Gardening

We used a RFID reader (Tradewind Technologies LLC, Knoxville, Tenn.) that was attached to Treo 650 cell phone (Palm, Sunnyvale, Calif.). The device was placed in close proximity (less than 5 cm) to the RFID tags. Unlike traditional barcodes, the RFID tag does not need to be in direct line of sight of the reader. The tag can be embedded in the container holding the potted plant or covered with material or debris. This feature is important in outdoor settings where dirt, salt, snow, rain and dust is prevalent. To initiate a greenhouse experiment, a label containing the transponder was placed on the outside of a container. The RFID receiver was switched to the detection mode and an attention signal was displayed on the reader that indicated the RFID tag had been found. In this process, a unique sixteen-decimal RFID identifier was displayed on the screen (ex. E0070000021BF333). The precise location of the plant was obtained using a GPS enabled PDA. The GPS position of the potted plant was directly written on the RFID tag. To initiate this command, a touch screen button was pressed to activate the Ande 929 RFID program (Tradewind Technologies LLC, Knoxville, Tenn.). The GPS reading, date, and additional data were entered using the digital keypad on the cell phone. A touch screen button was then pressed and the receiver switched to the writing mode and recorded the information on the RFID tag. A photograph of the plant was taken using the camera on the Treo 650 cell phone. Audio information about the experiment was also recorded and directly linked to the picture. The name of the photo was then changed to RFID identifier and entered into the cell phone contact database. This program is normally used to store addresses and telephone numbers. The photo, text, and audio files were sent to a personal email account by cell phone MMS. The subject line for the email message was the RFID number. This labeling system allowed the RFID tag to be linked to the MMS message.

In order to retrieve specific plant data, a query for the RFID number was initiated on the cell phone. Since the contact information, photo, and MMS contained the RFID number, the unique plant specific information was rapidly obtained. RFID tags, cell phones, and multimedia messaging were used to instantaneously retrieve information (photos and audio files) that was archived on local or distal databases. In this process the photos were viewed on the cell phone display and the audio files were replayed using the embedded speaker. Personalized information such as name, date, nucleotide sequence, location, and GPS that was directly written on the RFID tag could be simultaneously retrieved on the receiver's screen along with photographs and the audio files. This process provided a rich, integrated way to view data. This mobile method allowed users to recall a specific event, or photo and directly link it to a plant.

There is limited space for storing data on the cell phone. To address this concern, we set up a system to transfer the RFID data to an external database. In this process we modified the cell phone address book by changing the field names. Information was rapidly transferred to portable computers via Bluetooth, IR, or USB HotSync connections. The information was then exported into Filemaker (Santa Clara, Calif.) databases that were used on Macintosh and PC Windows platforms. Multimedia messages that were sent by the cell phone to the portable computers could be imported into Filemaker using publicly available scripts.

Example 11

Forwarding Catch Data Using a RFID Enabled Cell Phone

RFID readers may become a standard feature in all cell phones. Nokia (Keilalahdentie, Finland) has introduced RFID shells for several of their GSM phones. We tested the Nokia 5140 because it is built for the outdoors. The compact, water resistant phone contained a compass, camera, and flashlight. The Nokia 5140 "shortcut" program was used to send RFID specific, SMS messages to other cell phones and email messages to portable computers. This feature is useful in outdoor recreational events where information about the sporting event is forwarded to external databases. In the outdoors, information about a specific fishing trip was sent on location to an external database. The information exchange was initiated by touching the back of phone to the tag. Using the cell phone keypad, the tag was defined by entering the telephone number/email address, RFID number, location, photo name, and catch data. The message was sent to an email address and phone number by placing the phone next to the tag. A log of the messages with a time stamp was automatically recorded on the cell phone.

Example 12

Recording Catch Data on a RFID Enabled Fishing Lure

On Jun. 19, 2005, a photo of a 170 lb halibut, GPS, location (Kodiak, Ak.), date, and voice recording was electronically recorded using a Treo 650 cell phone and a Tradewinds RFID reader. The information was stored on the cell phone and sent to a portable computer using multimedia messaging. The subject line of the message was the unique RFID number. The RFID tag was operationally attached to the fishing lure. In order to recall the event, the cell phone/RFID device was placed next to the lure and a RFID query was initiated. The information that was recorded on the RFID tag appeared on the screen of the cell phone/RFID device. Additional information such as the photo and voice recording was obtained by searching the cell phone multimedia messages for the unique RFID number. This method allows for an instant replay of the event. The value of the recreational object (lure) was enhanced by retrieving and replaying personalized data using cell phone and RFID technology.

Example 13

Recording a Memorable Skiing Event Using RFID

The invention functions as a device to replay, recall, or reenact a memorable event. The RFID tag contains a unique identifier and is used to record information and links to additional data. A PDA, computer, or smart cell phone containing a RFID reader is used by the owner to replay an event that involved a specific recreational item. The ability to recall the event using a RFID tag and reader enhances the value of the recreational item.

The invention can be used to increase the intrinsic value of recreational items. The tag may be attached to or embedded in gloves, clothing, hats, and ski equipment. The tag system can have information about the owner, date, location and event. Using a cell phone the user can photograph an outdoor scene and record an audio message. The image and voice data is digitally stored on the cell phone. The information (photo and audio file) is given unique identifiers (UIDs) that can be written on the RFID tag. This method allows for a direct link between the RFID enabled recreational item and data collected at the event. The advantage of the system is that it allows user to add information and data links to an object as the event occurs. This will reduce errors in labeling and retrieving valuable information.

In order to recall an event, the user places the PDA or cell phone in close proximity to the RFID enabled item. In one instance, the user presses a button or voice activates the receiver to read the tag (PDA or cell phone) so that it switches to a detection mode. An attention signal can be displayed on the reader indicating that RFID device has been found and that the data has been transferred. Data links that are written on the tag are used to instantaneously retrieve information (photos and audio files) that has been archived on local or distal databases. The photos are viewed on the PDA or cell phone display and the audio files are replayed using the embedded speaker. Personalized information such as name, date, location, elevation, and GPS that was directly written on the RFID tag can be simultaneously viewed on the receiver's screen while seeing the photographs and listening to the audio files. The process provides a rich, integrated way to view historical events. This mobile, data intensive method allows a user to recall a special experience and directly link the memory to a recreational object. The experience can be shared with others by emailing a RFID multimedia message to relatives and friends.

Example 14

Treasure Hunt Using RFID Tags

We have developed an outdoor recreation game that uses RFID tags, cell phones, MMS, and GPS. In this game a RFID user hides an object that contains an RFID tag. The player then publishes the GPS coordinates so that other RFID users could go on a "treasure hunt" to find the cache. The game was conducted in the outdoor environment. Clues to the treasure (including GPS readings and photos) were posted on internet sites, brochures, and consumer items. Electronic information was stored on RFID tags that were hidden in the environment. Players of the game located the RFID tags and caches using GPS and RFID readers. When the objects were found, data, personalized information, and links to internet web pages were written on the tags using RFID enabled cell phones or PDAs. Instructions, directions, or clues to nearby buried caches were included on the tags. Additional, personalized information such as photos, videos, and audio files were uploaded to electronic databases on the internet. Date, time, RFID identification number, GPS coordinates, audio files, and photos were sent to email accounts by cell phone MMS. The subject line for the email message was the RFID number. This labeling system allowed the player, treasure, and RFID tag to be linked to the MMS message. This mobile game allowed users to recall an event and directly link it to buried treasure.

Example 15

RFID Trophy

RFID enabled trophies can be used to replay, recall, or reenact a sporting event. In this example a RFID tag was attached to a trophy. During a children's soccer game, we used a cell phone to record and store information (audio, photo, and video files). Winners and participants of the game or contest were awarded trophies. We physically attached a RFID tag to the bottom of the trophy. Links to the data files were written on the RFID enabled trophy. Additional information such as name, date, time, and location were written on the tag using a Treo 650 cell phone and a Tradewinds RFID reader. The trophy was placed in a display case for viewing and storage. In order to recall the memorable event, the cell phone/RFID device was placed next to the trophy and a RFID query was initiated. The information that was recorded on the RFID trophy appeared on the screen of the cell phone/RFID device. Additional information such as photo and voice recordings was obtained by searching the cell phone database. The experience was shared with relatives and friends by emailing a RFID multimedia message.

INCORPORATION BY REFERENCE

All patents, patents applications, and publications cited are incorporated herein by reference.

Equivalents

The foregoing written specification is considered to be sufficient to enable one skilled in the art to practice the invention. Indeed, various modifications of the above-described makes for carrying out the invention which are obvious to those skilled in the art are intended to be within the scope of the following claims.

What is claimed is:

1. A method of recording and recalling a consumer experience, comprising:
   a) associating an RFID tag to a recreational item to allow the RFID-tagged item to be associated with an event;
   b) experiencing said event with the RFID-tagged recreational item;
   c) recording information comprising personal and historical information associated with said event;

d) depositing the information on the RFID tag that is associated with the recreational item so that the event can be recalled from the RFID tag that is associated with the recreational item; and
e) recalling said information.

2. The method according to claim 1 further comprising sharing said information.

3. The method according to claim 1 wherein said recreational item is selected from the group consisting of:
   a) a toy wherein the toy is a stuffed animal;
   b) a sports item wherein the sports item is skiing, diving, or surfing equipment or hunting equipment, a surfboard, a snowboard, a ski, a fishing pole, fishing lure, a fish, a gun, a bicycle, a trophy, a wetsuit, a golf ball, or a golf club;
   c) an item of clothing wherein the item of clothing is a hat, a scarf, a coat, a shirt, a sweater, a sweat shirt, a shoe, a glove, or pants;
   d) a vehicle wherein the vehicle is a scooter, a car, a motorcycle, an airplane, a train, or a skateboard;
   e) a gift item, a ticket, a post card, and sun glasses.

* * * * *